United States Patent [19]
Foucher et al.

[11] Patent Number: 5,907,001
[45] Date of Patent: May 25, 1999

[54] PROCESS FOR THE PREPARATION OF PHOTOPATTERNABLE POLYMERS

[75] Inventors: Daniel A. Foucher, Toronto, Canada; Katsumi Daimon, Odawara, Japan; Peter M. Kazmaier, Mississauga, Canada; Timothy J. Fuller, Pittsford; Ram S. Narang, Fairport, both of N.Y.

[73] Assignee: Xerox Corporation, Stamford, Conn.

[21] Appl. No.: 08/936,691

[22] Filed: Sep. 24, 1997

[51] Int. Cl.$^6$ .................................................... C08J 3/28
[52] U.S. Cl. .............................................. 522/114; 522/149
[58] Field of Search ...................................... 522/149, 114

[56] References Cited

U.S. PATENT DOCUMENTS

| | | | |
|---|---|---|---|
| 5,017,458 | 5/1991 | Soda et al. ................................ | 430/296 |
| 5,376,732 | 12/1994 | Stover et al. ............................. | 525/388 |
| 5,468,814 | 11/1995 | Stover et al. ............................. | 525/390 |
| 5,761,809 | 6/1998 | Fuller et al. .............................. | 522/165 |

*Primary Examiner*—Nathan M. Nutter
*Attorney, Agent, or Firm*—John L. Haack

[57] ABSTRACT

A process comprising:

reacting a first polymer containing at least one haloalkyl substituted styrene, with a reactive acrylate compound wherein the haloalkyl substituent is converted to an alkylacrylate ester or an alkylacrylate ester ammonium salt to form an acrylated second polymer, and irradiating said acrylated second polymer.

13 Claims, No Drawings

PROCESS FOR THE PREPARATION OF PHOTOPATTERNABLE POLYMERS

REFERENCE TO COPENDING AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; U.S. Pat. No. 5,412,047, issued May 2, 1995, entitled "HOMOPOLYMERIZATION PROCESSES WITH OXONITROXIDES", wherein there is illustrated stable free radical moderated polymerization processes which employ an oxo nitroxide compound which enable the controlled homopolymerization of acrylate and related monomer compounds; U.S. Pat. No. 5,401,804, issued Mar. 28, 1995, which is a divisional application of U.S. Pat. No. 5,322,912, entitled "POLYMERIZATION PROCESS AND TONER COMPOSITIONS THEREFROM"; U.S. Pat. No. 5,449,724, issued Sep. 12, 1995, entitled "STABLE FREE RADICAL POLYMERIZATION PROCESS AND THERMOPLASTIC MATERIALS PRODUCED THEREFROM", which discloses high pressure stable free radical polymerization processes for preparing, for example, polyethylene rubbers; U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin prepared by anionic means comprised of a monomodal polymer resin or monomodal polymer resin blends and wherein the monomodal resin or resin blends possess a narrow polydispersity; U.S. Pat. No. 5,498,679, (D/95112), issued Mar. 12, 1996, entitled "PROCESS FOR PRODUCING BRANCHED AND STAR THERMOPLASTIC RESIN POLYMERS"; U.S. Pat. No. 5,549,998, issued Jul. 27, 1996, a divisional application of U.S. Pat. 5,322,912 and 5,401,804, entitled "POLYMERIZATION PROCESSES AND TONER COMPOSITIONS THEREFROM"; U.S. Pat. No. 5,545,504, issued Jul. 13, 1996 entitled "INK JETTABLE TONER COMPOSITIONS AND PROCESSES FOR MAKING AND USING"; U.S. Pat. No. 5,530,079, issued Jun. 26, 1996, entitled "POLYMERIZATION PROCESSES"; U.S. Pat. No. 5,552,502, issued Sep. 3, 1996, entitled "POLYMERIZATION PROCESSES"; and U.S. Pat. No. 5,608,023, issued Mar. 4, 1997, entitled "RATE ENHANCED POLYMERIZATIONS".

Attention is directed to commonly owned and assigned applications Application Numbers, U.S. Ser. No. 08/307,192 (D/92581), filed Mar. 25, 1993, entitled "SEMISUSPENSION POLYMERIZATION PROCESSES"; U.S. Ser. No. 08/214,518 (D/92579), filed Mar. 18, 1994, entitled "EMULSION POLYMERIZATION PROCESSES AND TONER COMPOSITIONS THEREFROM", a continuation-in-part of U.S. Ser. No. 07/976,604, filed Nov. 16, 1992; now U.S. Pat. Ser. No. 5,322,912 U.S. Ser. No. 08/223,418 (D/93729), filed Apr. 4, 1994, entitled "AQUEOUS POLYMERIZATION PROCESSES"; U.S. Ser. No. 08/292,670 (D/94133), filed Aug. 18, 1994, entitled "BIFUNCTIONAL MACROMOLECULES AND TONER COMPOSITIONS THEREFROM"; U.S. Ser. No. 08/345,371 (D/94743), filed Nov. 18, 1994, entitled "POLYMERIZATION PROCESSES; U.S. Ser. No. 08/348,022 (D/94772), filed Dec. 1, 1994, entitled "POLYMERIZATION MULTIBLOCK COPOLYMER PROCESS AND COMPOSITIONS THEREOF"; U.S. Ser. No. 08/348021 (D/94635), filed Dec. 12, 1994, entitled "POLYMERIZATION PROCESS AND COMPOSITIONS THEREOF; U.S. Ser. No. 08/413,752 (D/95071), filed Mar. 30, 1995, entitled "STABLE FREE RADICAL POLYMERIZATION UNDER SUPERCRITICAL CONDITIONS AND POLYMERS PRODUCED THEREBY"; U.S. Ser. No. 08/413,645 (D/94136), filed Mar. 30, 1995 now U.S. Pat. No. 5,773,510, entitled "PROCESSES FOR THE PREPARATION OF BRANCHED POLYMERS"; U.S. Ser. No. 08/553,200 (D/95421), filed Nov. 7, 1995, Now U.S. Pat. No. 5,739,229 entitled "POLYMERIZATION PROCESSES"; U.S. Ser. No. 08/664,702 (D/95639), filed Jun. 19, 1996, now U.S. Pat. 5,723,511 entitled "PROCESSES FOR PREPARING TELECHELIC, BRANCHED AND STAR THERMOPLASTIC RESIN POLYMER"; and U.S. Ser. No. 08/705,479 (D/95638) filed Aug. 29, 1996, now U.S. Pat. 5,761,809 entitled "PROCESSES FOR SUBSTITUTING HALOALKYLATED POLYMERS WITH UNSATURATED ESTER, ETHER, AND ALKYLCARBOXYMETHYLENE GROUPS".

The disclosures of each of the above mentioned patents and copending applications are incorporated herein by reference in their entirety.

BACKGROUND OF THE INVENTION

The present invention is directed to a process for preparing photopatternable polymers and to thermal ink jet print heads generated with the photopatternable polymers. More specifically, the present invention is directed to a process for the functionalization, for example, acrylation, methacrylation, or aminoalkylacrylation, of polymers containing halogenated aromatic mers or monomers, for example, homopolymers of poly(haloalkylstyrene) and random copolymers comprised of polystyrene and poly (haloalkylstyrene), and subsequent patterning. In embodiments of the present invention, there are provided processes for the preparation of an intermediate molecular weight, narrowly dispersed, poly(haloalkylstyrene) or copoly (haloalkylstyrene-styrene) using a stable free radical moderated polymerization procedure, followed by reacting these polymers with a reactive acrylate, alkacrylate salt, or an alkylaminoacrylate in, for example, sequential reactions, or alternatively, by a one pot procedure thereby forming a photopatternable acrylated, alkacrylated, or alkylaminoacrylated polymer. The acrylated, alkacrylated, or alkylaminoacrylated polymer can be conveniently and readily crosslinked when exposed to radiation of, for example, less than about or equal to about 400 nanometers.

In microelectronics applications, there is a great need for low dielectric constant, high glass transition temperature or highly crosslinked, thermally stable, photopatternable polymers for use as interlayer dielectric layers and as passivation layers which protect microelectronic circuitry. Poly(imides) are widely used in attempts to satisfy these needs; these materials, however, have disadvantageous characteristics such as relatively high water sorption and hydrolytic instability. Thus, there is a need for high performance polymers which can be effectively photopatterned and developed at high resolution.

One particular application for such materials is the formulation of ink jet print heads. Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, these systems are much simpler than the continuous stream type. There are different types of drop-on-demand ink jet systems. One type of drop-on-demand system has as major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality images. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of system are an ink filled channel having a nozzle on one end and a heat generating resistor near the nozzle. Printing signals representing s digital information originate an electric current pulse in a resistive layer within each ink passageway near the orifice or nozzle, causing the ink in the immediate vicinity to vaporize almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which heat is dissipated by vaporization. The expansion of the bubble forces a droplet of ink out of the nozzle, and once the excess heat is removed, the bubble collapses. At this point, the resistor is no longer being heated because the current pulse has passed and, concurrently with the bubble collapse, the droplet is propelled at a high rate of speed in a direction towards a recording medium. The surface of the printhead encounters a severe cavitational force by the collapse of the bubble, which tends to erode it. Subsequently, the ink channel refills by capillary action. This entire bubble formation and collapse sequence occurs in about 10 microseconds. The channel can be refired after about 100 to about 500 microseconds minimum dwell time to enable the channel to be refilled and to enable the dynamic refilling factors to become somewhat dampened.

PRIOR ART

U.S. Pat. Nos. 5,376,732, issued Dec. 27, 1994, and 5,468,814, issued Nov. 21, 1995, to Stover et al., disclose polymers comprising phenyl rings pendant from the polymer chains or incorporated therein, wherein the phenyl rings are substituted with aldehyde and or carboxylic acid functionalities and or derivatives thereof. Also disclosed is a catalytic oxidation process for producing such polymers from precursor polymers containing benzylic carbon atoms.

U.S. Pat. No. 5,017,458, issued May 21, 1991, to Soda et al., discloses a method for production of a graft copolymer including the step of adding to a base polymer capable of forming first radicals when irradiated with radiation an additive capable of combining with the first radicals to form second radicals stable against oxygen, the step of irradiating the base polymer containing the additive with radiation, and the step of introducing a monomer under an atmosphere free of oxygen, thereby to graft copolymerize the irradiated base polymer and the monomer.

Thermal ink jet systems and processes are known and are described in, for example, U.S. Pat. No. 4,601,777, U.S. Pat. No. 4,251,824, U.S. Pat. No. 4,410,899, U.S. Pat. No. 4,412,224, U.S. Pat. No. 4,532,530, and U.S. Pat. No. 4,774,530, the disclosures of each of which are incorporated herein by reference in their entirety.

The present invention is suitable for application to ink jet printing devices and processes, including drop-on-demand systems such as thermal ink jet printing, piezoelectric drop-on-demand printing, and the like.

In ink jet printing, a printhead is usually provided having one or more ink-filled channels communicating with an ink supply chamber at one end and having an opening at the opposite end, referred to as a nozzle. These print heads form images on a recording medium such as paper by expelling droplets of ink from the nozzles onto the recording medium. The ink forms a meniscus at each nozzle prior to being expelled in the form of a droplet. After a droplet is expelled, additional ink surges to the nozzle to reform the meniscus.

In thermal ink jet printing, a thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. The rapidly expanding vapor bubble pushes the column of ink filling the channel towards the nozzle. At the end of the current pulse the heater rapidly cools and the vapor bubble begins to collapse. However, because of inertia, most of the column of ink that received an impulse from the exploding bubble continues its forward motion and is ejected from the nozzle as an ink drop. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

Ink jet print heads include an array of nozzles and may, for example, be formed of silicon wafers using orientation dependent etching (ODE) techniques. The use of silicon wafers is advantageous because ODE techniques can form structures, such as nozzles, on silicon wafers in a highly precise manner. Moreover, these structures can be fabricated efficiently at low cost. The resulting nozzles are generally triangular in cross-section. Thermal ink jet print heads made by using the above-mentioned ODE techniques typically comprise a channel plate which contains a plurality of nozzle-defining channels located on a lower surface thereof bonded to a heater plate having a plurality of resistive heater elements formed on an upper surface thereof that a heater so that a heater element is located in each channel. The upper surface of the heater plate typically includes an insulative layer which is patterned to form recesses exposing the individual heating elements. This insulative layer is referred to as a "pit layer" and is sandwiched between the channel plate and heater plate. For examples of print heads employing this construction, reference for example, U.S. Pat. No. 4,774,530 and U.S. Pat. No. 4,829,324, the disclosures of which are totally incorporated herein by reference. Additional examples of thermal ink jet print heads are disclosed in, for example, U.S. Pat. No. 4,835,553, U.S. Pat. No. 5,057,853, and U.S. Pat. No. 4,678,529, the disclosures of which are totally incorporated herein by reference.

The photopatternable polymers prepared by the process of the present invention are also suitable for other photoresist applications, including other microelectronics applications, printed circuit boards, lithographic printing processes, and the like.

Photopatternable polymers for ink jet applications prepared from chloromethylated poly(arylene ether ketones) are described in the aforementioned U.S. Pat. No. 5,761,809.

While known compositions and processes are suitable for their intended purposes, a need remains for improved materials suitable for microelectronics applications. A need also remains for improved ink jet print heads. Further, there is a need for photopatternable polymeric materials which are heat stable, electrically insulating, and mechanically robust. Additionally, there is a need for photopatternable polymeric materials which are chemically inert with respect to the materials commonly employed in ink jet ink compositions and which can also withstand long term hygrothermal cycling in contact with those ink compositions. There is also a need for photopatternable polymeric materials which exhibit low shrinkage during post-cure steps in microelectronic device fabrication processes. In addition, a need remains for photopatternable polymeric materials which exhibit a relatively long shelf life. Further, there is a need for photopatternable polymeric materials which can be patterned with relatively low photo-exposure energies. Additionally, a need remains for photopatternable polymeric materials which, in the cured form, exhibit good solvent resistance. There is also a need for photopatternable polymeric materials which, when applied to microelectronic devices by spin casting techniques, exhibit reduced edge bead and no apparent lips and dips. In addition, there remains a need for processes for preparing photopatternable polymeric materials with the above advantages. Further, a need remains for processes for preparing photopatternable polymeric materials to produce microlithographic features with high aspect ratios by the incorporation of polymerizable groups and/or cross-linking sites pendant to the polymers. There is also a need for the control of molecular weight and polydispersity of the polymer to be functionalized for optimum photopatterning. Additionally, there is a need for processes for preparing aromatic polymers having acrylic type functional groups, such as, acrylates, methacrylates, and alkylated aminoacrylates, pendant from the polymer chains. There is also a need for processes for preparing high resolution, photopatternable, narrow molecular weight materials, having crosslinkable acrylate type functional groups pendant from the polymer chains.

SUMMARY OF THE INVENTION

Objects of the present invention include:

providing polymeric materials with the above noted advantages;

providing improved polymeric materials with controllable molecular weights and narrow polydispersities via a stable free radical moderated polymerization processes, and which polymer materials are suitable for microelectronics applications;

providing improved ink jet print heads;

providing photopatternable polymeric materials which are heat stable, electrically insulating, and mechanically robust;

providing photopatternable polymeric materials which are chemically inert with respect to the materials commonly employed in ink jet ink compositions;

providing photopatternable polymeric materials which exhibit low shrinkage during post-cure steps in microelectronic device fabrication processes;

providing photopatternable polymeric materials which can be patterned with relatively low photo-exposure energies;

These and other objects of the present invention, or specific embodiments thereof, can be achieved by providing processes to form crosslinked polymers, and more specifically which processes comprise:

reacting a first polymer containing at least one, and more specifically, from 1 to about 5 different haloalkyl substituted styrene mers, with a reactive acrylate compound to form an acrylated second polymer, wherein the haloalkyl substituent is converted to an alkylacrylate ester substituent; and irradiating said acrylated second polymer for a sufficient time to form a crosslinked third polymer.

The present invention relates, in embodiments, to a process comprising:

reacting a first polymer, such as a homopolymer of a haloalkylstyrene, such as poly(chloromethylstyrene) of the formula

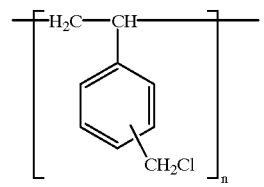

wherein n is an integer, or number of from about 10 to about 100,000 and represents the number of chloromethylstyrene mers, with a reactive acrylate compound of the formula

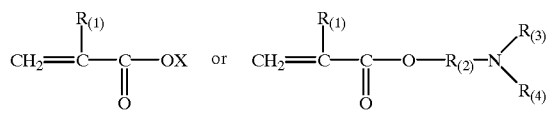

wherein X is hydrogen, an alkali metal, an alkaline earth, a linear or branched alkyl substituent with from 1 to about 25 carbon atoms, and $R_{(1)}$ is selected from the group consisting of hydrogen, or linear and branched alkyl substituents with from 1 to about 25 carbon atoms, $R_{(2)}$ of the amino acrylate substituent is a linear or branched alkyl chain with from about 1 to about 25 carbon atoms, and $R_{(3)}$ and $R_{(4)}$ are selected from the group consisting of hydrogen, or linear and branched alkyl substituents with for example, from 1 to about 25 carbon atoms, to form a second acrylated polymer of the formula

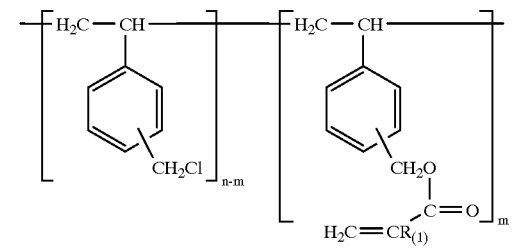

or

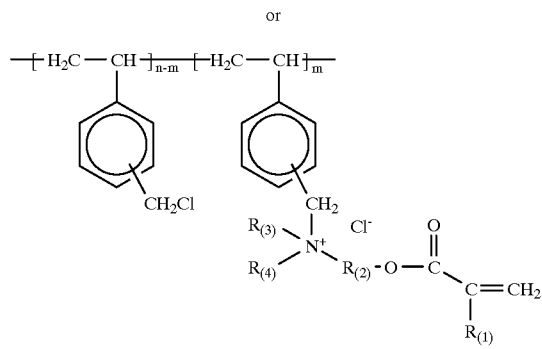

wherein m is an integer, or number of from about 10 to about 100,000 and represents the number of acrylated monomer units, and n-m is an integer, or number of from about 100,000 to about 10 representing the number of unreacted monomer units; and irradiating the second acrylated polymer for a time to form a crosslinked third polymer or copolymer, for example, of the formula

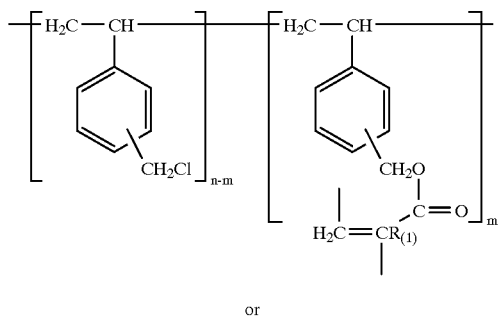

or

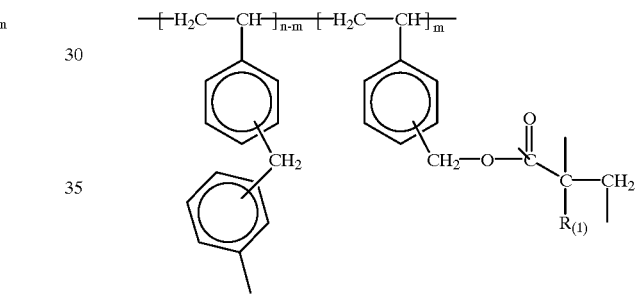

wherein from about 0.1 to about 100 percent of the acrylate double bonds contained in the second polymer become crosslinked to another acrylate double bond in the third polymer or another double bond of equivalent reactivity in the third polymer or copolymer.

Moreover, a secondary thermal crosslinking can occur between, for example, chloromethyl groups and neighboring aromatic groups with the loss of hydrochloric acid to form methylene bridges illustrated by the formula:

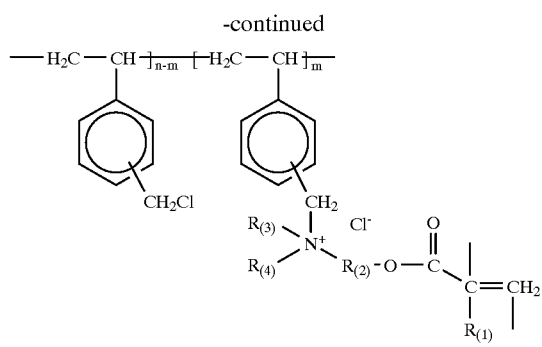

The resultant cross linked and bridged structure is very thermally and mechanically stable and reinforces the more labile vinyl type bonds affording excellent heat resistance.

DETAILED DESCRIPTION OF THE INVENTION

The present invention is directed to a process for preparing narrow molecular weight styrene containing polymeric materials having unsaturated, free radical reactive pendant acrylic or acrylate functional groups, such as, acrylate, alkacrylate, and/or aminoacrylate groups, which polymeric materials can subsequently be selectively photochemically crosslinked, and optionally thermally crosslinked at elevated temperatures, thereby providing a highly effective photopatternable polymer composition and method. In embodiments, preferred starting materials include haloalkyl substituted styrene mers such as chloromethylated styrene homopolymers and random and block copolymers of chloromethylstyrene and styrene. Suitable haloalkyl substituted polystyrenic starting materials are, for example, chloromethylated polystyrenic materials and include those of the formulas:

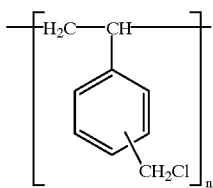

PCMS

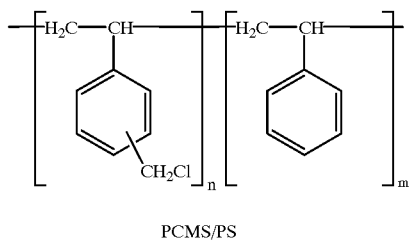

PCMS/PS wherein PCMS is the homopolymer poly (chloromethylstyrene) and PCMS/PS is copoly (chloromethylstyrene-styrene), and n and m are integers representing the number of repeating monomer units. Preferably, n is such that the number average (Mn) and weight average (Mw) molecular weights of the starting material, or polymer are from about 50,000 to about 5,000 for the Mw, and about 45,000 to about 4,500 for the Mn, and more preferably with Mw's from about 25,000 to about 5,000 and Mn of about 20,000 to about 4,500. Preferably, n is an integer of from about 350 to about 35, and more preferably from about 150 to about 35. Preferably, the polydispersities of these polymers are generally between about 1.1 to about 2.0, and more preferably about 1.2 to about 1.5 and most preferred about 1.2 or below. Stable free radical moderated polymerization processes for the preparation of narrowly dispersed styrenics containing these materials are known, and disclosed, for example, in the aforementioned commonly owned U.S. Pat. No. 5,322,912, and in Georges et al., *Macromolecules*, 26, 2987 (1993). For applications wherein the photopatternable polymer is to be used as a layer in a thermal ink jet printhead, the poly (chloromethylstyrene) material preferably has a number average (Mn) molecular weight of from about 3,000 to about 20,000, more preferably from about 3,000 to about 10,000, and even more preferably from about 3,500 to about 5,500.

In embodiments, the present invention is directed to a process comprising:

reacting a first polymer, with a polydispersity of from about 1.1 to about 2.0 and containing at least one haloalkyl substituted styrene mer, with a reactive acrylate compound to form an acrylated second polymer, wherein the haloalkyl substituents of the haloalkyl substituted styrene mer have been converted to an alkylacrylate ester by the reactive acrylate compound; and irradiating the second acrylated polymer for a sufficient time to form a crosslinked third polymer.

The halogen of the at least one haloalkyl substituted styrene mer is, for example, chloride, bromide, iodide, or fluoride and the alkyl of the at least one haloalkyl substituted styrene mer contains from 1 to about 20 carbon atoms. The first polymer is, for example, homopolymers of haloalkylstyrene, and copolymers comprised of haloalkylstyrene mers and mers of other styrene compounds, such as haloalkylstyrene compounds wherein the alkyl substituent has from 1 to about 20 carbon atoms and the halogen is F, Br, Cl, or 1, alkyl substituted styrene compounds wherein the alkyl substituent has from 1 to about 15 carbon atoms, such as methylstyrene, alkoxystyrenes wherein the alkoxy substituent has from 1 to about 15 carbon atoms, such as pentoxystyrene, halostyrenes wherein the halogen is F, Br, Cl, or 1, dienes such as butadiene, isoprene, myrcene, alkyl acrylates with from 4 to about 25 carbon atoms, such as methyl acrylate, and alkacrylates, such as methyl methacrylate and alkacrylic acids, such as methacrylic acid, and the like, and mixtures thereof. The first polymer contains from about 0.1 percent to about 100 percent by weight of haloalkyl styrene mers, alternatively, from 1 to about 100, 000 haloalkyl styrene mers. As used herein "mer" refers to the polymeric structural components or units arising from polymerization of distinct monomer components or units.

The reactivity of the reactive acrylate compound is potentially three-fold. First, with respect to the nucleophilic substitution reaction, the acrylate or acrylic acid compound is capable of displacing the halogen atom on the alkyl substituent of the haloalkylstyrene mer or mers, or alternatively, undergoing a reaction which will produce the desired acrylate ester product, for example, an acylation or coupling type reaction which produces an acrylate ester product from an acrylate and a haloalkyl styrene and without producing undesired or premature side reactions of the carbon-carbon double bond of the acrylate substituent. Second, with respect to the cross-linking reaction, the double bond contained in the acrylate ester substituted polymer product derived from the foregoing nucleophilic substitution or the like reaction, must readily cross-link with another acrylate or equivalent double bond when irradiated or excited, for example, when exposed to photons below about 400 nanometers. A third reaction is possible when the sample is annealed to elevated temperatures (>200° C. ) wherein the —CH$_2$—Cl groups of the same polymer or neighboring polymers can thermally cross-link to form methylene bridges as illustrated herein.

The reactive acrylate compound can be an acrylic acid, an acrylic acid salt, an acrylate ester having from 4 to about 25 carbon atoms, an alkyl substituted acrylate ester having from 5 to about 25 carbon atoms, an alkyl substituted acrylic acid having from 5 to about 25 carbon atoms, an alkyl substituted acrylic acid salt having from 5 to about 25 carbon atoms, a di- or tri-alkylaminoacrylate having from 5 to about 25 carbon atoms, and the like acrylates, and mixtures thereof.

The acrylated polymer can be, for example, a homopolymer of acrylated alkyl substituted styrene, such as poly (acrylated methylstyrene), random, block, multiblock, and tapered copolymers comprised of acrylated alkyl substituted styrene mers and at least one monomer or mers of other styrene compounds, such as haloalkylstyrene compounds wherein the alkyl substituent has from 1 to about 20 carbon atoms and the halogen is F, Br, Cl, or 1, alkyl substituted styrene compounds wherein the alkyl substituent has from 1 to about 15 carbon atoms, such as methylstyrene, alkoxystyrenes wherein the alkoxy substituent has from 1 to about 15 carbon atoms, such as pentoxystyrene, halostyrenes wherein the halogen is F, Br, Cl, or 1, dienes such as butadiene, isoprene, myrcene, alkyl acrylates with from 4 to about 25 carbon atoms, such as methyl acrylate, and alkacrylates, such as methyl methacrylate and alkacrylic acids, such as methacrylic acid, and the like, and mixtures thereof.

The reacting or reaction of the reactive acrylate compound and the haloalkyl substituted polymer to achieve a net substitution reaction can be accomplished by, for example, thermally, electrochemically, or photochemically, and combinations thereof. The irradiating or irradiation of the acrylated polymer can be accomplished with a light source at from about 190 nanometers to about 400 nanometers, for example, as afforded by an actinic radiation source.

In other embodiments, the present invention provides a process comprising:

reacting a first haloalkyl substituted styrene polymer, for example, of the formula

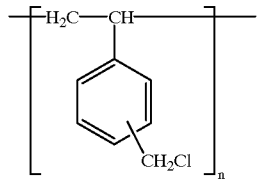

wherein n is an integer, or number of from about 10 to about 100,000 and represents the number of chloromethylstyrene mers, with a reactive acrylate compound of the formula

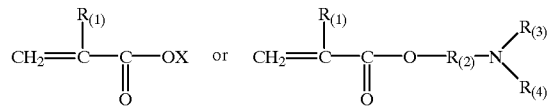

wherein X is hydrogen, an alkali metal, an alkaline earth, for example, as found in Group IA and IIA of the periodic table of elements, a linear or branched alkyl substituent with from 1 to about 25 carbon atoms, and $R_{(1)}$ is hydrogen, or linear and branched alkyl substituents with from 1 to about 25 carbon atoms, $R_{(2)}$ of the alkylamino acrylate moiety is a linear or branched alkyl chain with from about 1 to about 25 carbon atoms, and $R_{(3)}$ and $R_{(4)}$ are hydrogen, or linear and branched alkyl substituents with from 1 to about 25 carbon atoms, to form a second acrylated polymer, which can be partially acrylated, for example, of the formula

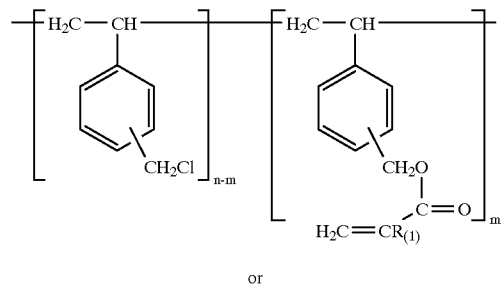

or

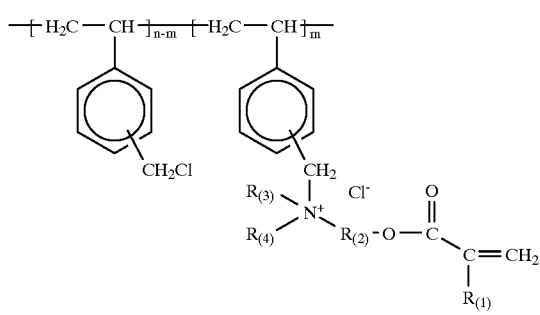

wherein m is an integer, or number of from about 10 to about 100,000 and represents the number of acrylated monomer units, and n-m is an integer, or number of from about 100,000 to about 10 representing the number of unreacted monomer units; and irradiating the second acrylated polymer for a time to form a crosslinked third polymer or copolymer, for example, of the formula

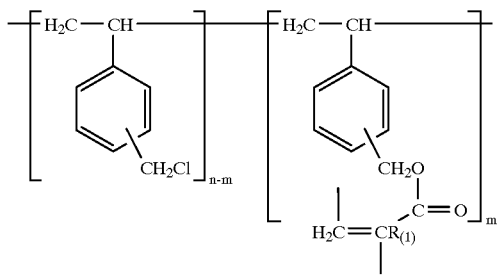

or

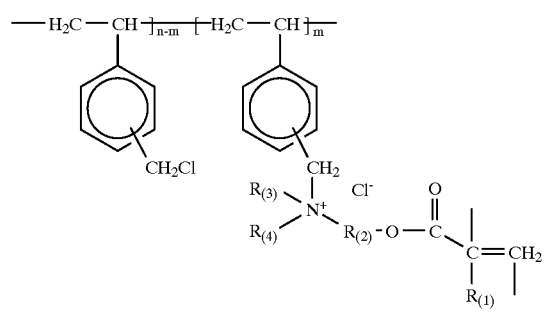

wherein from about 0.1 to about 100 percent of the acrylate double bonds contained in the second polymer become crosslinked to another acrylate double bond in forming the third polymer.

The first polymer, in embodiments, can further comprise "mers" of styrene compounds, such as haloalkylstyrene compounds wherein the alkyl substituent has from 1 to about 15 carbon atoms and the halogen is F, Br, Cl, or 1, alkyl substituted styrene compounds wherein the alkyl substituent has from 1 to about 25 carbon atoms, such as methylstyrene, alkoxystyrenes wherein the alkoxy substituent has from 1 to about 25 carbon atoms, such as pentoxystyrene, halostyrenes wherein the halogen is F, Br, Cl, or 1, dienes such as butadiene, isoprene, myrcene, alkyl acrylates with from 4 to about 25 carbon atoms, such as methyl acrylate, and alkacrylates, such as methyl methacrylate and alkacrylic acids, such as methacrylic acid, and the like, and mixtures thereof.

The reacting of the reactive acrylate compound and the haloalkyl substituted styrene mers of the polymer or copolymer can be accomplished by heating at a temperature of from about 30 to about 100° C., and preferably accomplished in the presence of polar aprotic solvent, for example, dimethylacetamide, dimethylformamide, N-methylpyrrolidinone, dimethyl sulfoxide, and the like. The substitution reaction or heating reaction is preferably accomplished in the absence of light to prevent complications arising from the product polymer prematurely crosslinking. It is also readily evident and understood by one of ordinary skill in the art that other acrylate compounds, such as homologs and analogs of the formula $CH_2=C(R)-CO_2X$, may be used in place of, or in addition to the aforementioned acrylates, to the extent that the acrylated or equivalent second polymer product can be successfully formed and subsequently cross-linked as illustrated herein. Although not explicitly shown in the generalized formulas herein, it is readily evident and understood by one of ordinary skill in the art that the polymeric materials prepared by stable free radical polymerization methods will contain, for example, a free radical initiator compound bound to the polymer chain at one end and a covalently bound stable free radical compound or group at the other end of the polymer chain, such as a benzoyl peroxide fragment and a TEMPO, as for example in Examples I and XIII below and reference for example, the aforementioned commonly owned U.S. Pat. No. 5,322,912.

The poly(chloromethylstyrene) material can have the chloromethyl groups in, for example, either or both the 3 or 4 ring positions of styrene moiety. The ratio of the 3 to 4 ring substituents of approximately 55/45 is an example of a suitable poly(chloromethylstyrene) material.

The homo- or copolymers of the poly (chloromethylstyrene) materials are modified by substitution reactions with acrylate or acrylic type monomers, for example, acrylate or methacrylate salts, dialkylaminoacrylate, and the like compounds. Generally, the greater the degree of substitution of chloromethyl sites by acrylate containing sites leads to greater photosensitivity of the polymer. Different degrees of substitution may be desirable for different applications. When the homo- or copolymers of the poly(chloromethylstyrene) and analogous materials of the present invention are used as an intermediate in the synthesis of the acrylated polymer, too high a degree of acrylation may lead to excessive sensitivity, resulting in premature crosslinking of both exposed and unexposed polymer material when the material is exposed imagewise to activating radiation, whereas too low a degree of acrylation may be undesirable because of resulting unnecessarily long exposure times or unnecessarily high exposure energies. Because of the narrow polydispersity of poly (chloromethylstyrene) materials prepared by stable free radical moderated polymerization process, photopatterned resolution in modified poly(chloromethylstyrene) materials is enhanced. For applications wherein the photopatternable polymer is to be used as a layer in a thermal ink jet printhead, the degree of acrylation or alkylaminoacrylation, that is, the average number of acrylic or methacrylic or dialkylaminoacrylate groups per monomer, preferably is from about 0.05 to about 1.0, and more preferably from about 0.15 to about 0.30.

The chloromethylated homo- or copolymer is acrylated, methacrylated, aminoacrylated, and the like, by reacting the chloromethylated polymer with, for example, an acrylate or methacrylate salt, or a alkyl aminoacrylate, and the like monomers, in solution. Examples of suitable reactants include sodium acrylate, sodium methacrylate, diethylaminoethylacrylate, di-t-butylaminoethylacrylate, dihexylaminoethylacrylate, and the like. Examples of highly polar solvents suitable for acrylation and related reactions include N,N-dimethylacetamide(DMAC), dimethylformamide, N-methylpyrrolidinone, dimethylsulfoxide, and the like. Typically, the polymer and acrylate compound reactants are present in relative amounts of 0.1–10 fold molar equivalents, and preferably the acrylate reactant is present in, for example, a 2–3 fold molar excess with respect to the polymer. Typically, the reactants are present in a solution in total amounts of about 10 to about 35 weight percent, with the reactant polymer typically loaded in amounts of, for example, from about 5 to about 20 weight percent loading and the acrylate reactant in amounts of, for example, from about 5 to about 20 weight percent loading.

Higher levels of substitution by acrylate type monomers generally lead to greater photosensitivity of the polymer. Different degrees of acrylation may be desirable for different applications. Too high a degree of acrylation may lead to excessive sensitivity, resulting in crosslinking of both exposed and unexposed polymer material when the material is exposed imagewise to activating radiation, whereas too low a degree of acrylation may be undesirable because of resulting unnecessarily long exposure times or unnecessarily high exposure energies. For applications wherein the photopatternable polymer is to be used as a layer in a thermal ink jet printhead, the degree of acrylation, that is the average number of acrylate groups per monomer unit, is preferably from about 0.5 to about 1.2, and more preferably from about 0.7 to about 0.8.

The substitution of the chloromethyl substituents by acrylate type groups can be partial or complete. Longer reaction times generally lead to greater degrees of substitution of chloromethyl groups with acrylate ester type substituents.

Typical temperatures for accomplishing the substitution reactions are from about 25 to about 75° C., and preferably from about 40 to about 60° C. Typical reaction times are from about 1 to about 5 days, and preferably from about 3 to about 4 days. The reaction time can be reduced, for example, with the aid of a catalyst, such as crown ethers and other phase transfer agents such as tetrabutylammonium chloride, and the like, provided that premature cross-linking reactions are avoided, there is no discoloration to the polymer product, and the photopatternability and performance characteristics of the final product polymer are not negatively impacted.

Crosslinking or chain extension is effected by exposing the polymer to, for example, actinic radiation such that the polymer in exposed areas becomes crosslinked or chain extended. The composition is exposed in an imagewise pattern such that the polymer in the exposed areas becomes crosslinked or chain extended and the polymer in unexposed areas does not become crosslinked or chain extended, and wherein subsequent to exposure, the polymer in the unexposed areas is removed from the crosslinked or chain extended polymer, thereby forming an image pattern.

The photopatternable polymer can be developed by imagewise exposure of the material to radiation at a wavelength to which it is sensitive. The photopatterning is enhanced by the addition of sensitizers, such as Michler's Ketone (4,4'-bis(dimethylamino)benzophenone, and the like compounds. Exposure to, for example, ultraviolet radiation generally excites ethylenic bonds in the acrylate groups and leads to crosslinking at those sites which are in proximity to another acrylate ester group. Moreover, a tertiary thermal cure can take place at about 250° C. and above between unreacted chloromethyl groups and aromatic rings of the polystyrene chain to form methylene bridges. It is important to note that for some microelectronics resist applications that the replacement of substantially all Cl by acrylate groups may be desirable to reduce free ions in the system.

Photopatternable poly(haloalkylstyrene) materials prepared by the process of the present invention can be used as components in ink jet print heads. The print heads of the present invention can be of any suitable configuration, and are described in the aforementioned U.S. Pat. No. 5,761,809.

In other embodiments of the present invention, there is provided a process for preparing an ink jet printhead comprising:

(a) forming a photopatternable partially or completely acrylated polymer or acrylated copolymer, as illustrated herein, for example, of the formula

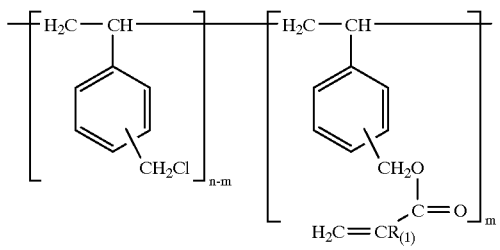

wherein m is an integer from about 10 to about 100,000 representing the number of acrylated monomer units, and n-m is an integer from about 100,000 to about 10 representing the number of unreacted monomer units;

(b) depositing a thick film layer, for example, from about 15 to about 45 microns of the acrylated polymer, and preferably between from about 20 to from about 30 microns, onto a first substrate with an array of heating elements and addressing electrodes, and with terminal ends attached thereto;

(c) exposing the deposited thick film layer to, for example, actinic radiation operating in the UV region of the electromagnetic spectrum, for example, less than about 400 nanometers, in an imagewise pattern such that the acrylated polymer in exposed areas crosslinks and the unexposed areas remain uncrosslinked, and wherein the unexposed areas correspond to areas on the first substrate with the heating elements and the terminal ends of the addressing electrodes;

(d) removing the uncrosslinked acrylated polymer, thereby forming recesses in the thick film layer, the recesses exposing the heating elements and the terminal ends of the addressing electrodes;

(e) providing a second substrate with a set of parallel grooves for subsequent use as ink channels and a recess for subsequent use as a manifold, the grooves being open at one end for serving as droplet emitting nozzles; and (f) aligning, mating, and bonding the first and second substrates together to form a printhead with the grooves in the second substrate being aligned with the heating elements in the first substrate to form droplet emitting nozzles.

In still other embodiments of the present invention there is provided, an ink jet printhead which comprises (i) an upper substrate with a set of parallel grooves for subsequent use as ink channels and a recess for subsequent use as a manifold, the grooves being open at one end for serving as droplet emitting nozzles, (ii) a lower substrate in which one surface thereof has an array of heating elements and addressing electrodes formed thereon, and (iii) a layer deposited on the surface of the lower substrate and over the heating elements and addressing electrodes and patterned to form recesses therethrough to expose the heating elements and terminal ends of the addressing electrodes, the upper and lower substrates being aligned, mated, and bonded together to form the printhead with the grooves in the upper substrate being aligned with the heating elements in the lower substrate to form droplet emitting nozzles, the layer comprising a crosslinked or chain extended polymer The present invention also embodies printing processes accomplished with print heads prepared in accordance with the present invention.

An embodiment of the present invention is directed to an ink jet printing process which comprises (1) preparing an ink jet printhead comprising a plurality of channels, wherein the channels are capable of being filled with ink from an ink supply and wherein the channels terminate in nozzles on one surface of the printhead, the preparation of which is in accordance with the process of the present invention; (2) filling the channels with an ink; and (3) causing droplets of ink to be expelled from the nozzles onto a receiver sheet in an image pattern. An embodiment of this process is directed to a thermal ink jet printing process, wherein the ink droplets are caused to be expelled from the nozzles by heating selected channels in an image pattern. The droplets can be expelled onto any suitable receiver sheet, such as fabric, plain paper such as XEROX® 4024 or 4010, coated papers, transparency materials, or the like.

Specific embodiments of the invention will now be described in detail. The Examples are intended to be illustrative, and the invention is not limited to the materials, conditions, or process parameters set forth in these embodiments. All parts and percentages are by weight unless otherwise indicated.

EXAMPLE I

Homo-Polymerization of Chloromethylstyrene

A poly(chloromethylstyrene) polymer of the formula

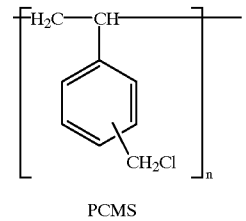

PCMS wherein n is approximately 116 was prepared as follows. Into a 50 mL, 3 necked round bottom flask equipped with an argon purge, reflux condenser, and stirring rod and paddle, was added a stable free radical agent 2,2'6,6'-tetramethyl-1-piperidinyloxy (TEMPO, 104 mg, 0.671 mmol), a free radical initiator benzoyl peroxide (BPO 123 mg, 0.508 mmol), and a monomer chloromethylstyrene (CMS, 20.5 g, 134 mmol). The solution was then immersed half way into a preheated oil bath (130° C.) and then stirred for 4 hrs. The reaction mixture was then cooled to approximately 80° C. and diluted with 10 mL of toluene and 40 mL of tetrahydrofuran. White polymer powder was recovered by precipitation of the diluted solution into 2 L of methanol and filtered. The polymer was redissolved in THF and then precipitated a second time in methanol, filtered, and vacuum dried overnight at 60° C. Total recovered polymer of poly (chloromethylstyrene) polymer was 13.4 g. GPC Data:Mw=23,400, Mn=17,700, Polydispersity (PD)=1.32.

EXAMPLE II

Homo-Polymerization of Chloromethylstyrene

A poly(chloromethylstyrene) polymer material of the formula PCMS of Example I wherein n is approximately 200 was prepared as follows. Into a 50 mL 3 necked round bottom flask equipped with an argon purge, reflux condenser, and stirring rod with a paddle, was added 2,2'6, 6'-tetramethyl-1-piperidinyloxy (TEMPO, 70 mg, 0.451 mmol), benzoyl peroxide (BPO 83 mg, 0.342 mmol), and chloromethylstyrene (CMS, 20.1 g, 132 mmol). The solution is then immersed half way into a preheated oil bath (130° C.)

and then stirred for 4 hrs. The reaction mixture was then cooled to approximately 80° C. and diluted with 10 mL of toluene and 40 mL of tetrahydrofuran. White polymer powder was recovered by precipitation of the diluted solution into 2 L of methanol and filtered. The polymer of poly (chloromethylstyrene) polymer was redissolved in THF, and precipitated second time in methanol, filtered, and vacuum dried overnight at 60° C. Total recovered polymer was 12.5 g. GPC Data: Mw=41,600, Mn=29,500, PD=1.41.

EXAMPLE III

Homo-Polymerization of Chloromethylstyrene

A poly(chloromethylstyrene) material of the formula PCMS of Example I wherein n is approximately 140 was prepared as follows. Into a 50 mL 3 necked round bottom flask equipped with an argon purge, reflux condenser, and stirring rod with a paddle, was added 2,2'6,6'-tetramethyl-1-piperidinyloxy (TEMPO, 167 mg, 1.07 mmol), benzoyl peroxide (BPO 196 mg, 0.813 mmol), and chloromethylstyrene (CMS, 20.1 g, 132 mmol). The solution was then immersed half way into a preheated oil bath (130° C.) and then stirred for 4 hrs. The reaction mixture was then cooled to approximately 80° C. and diluted with 10 mL of toluene and 40 mL of tetrahydrofuran. White polymer powder was recovered by precipitation of the diluted solution into 2 L of methanol and filtered. The polymer was redissolved in THF, and precipitated second time in methanol, filtered, and vacuum dried overnight at 60° C. Total recovered polymer of poly(chloromethylstyrene) was 12.3 g. GPC Data: Mw=26,300, Mn=21,200, PD=1.41.

EXAMPLE IV

Random Co-polymerization of Chloromethylstyrene and Styrene (9:1 PCMS/PS)

A copolymer, copoly(chloromethylstyrene-styrene), of the formula

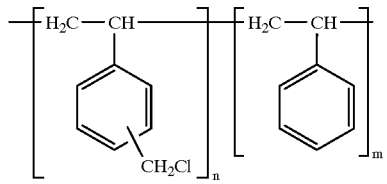

wherein n is approximately 130 and m is approximately 15 was prepared as follows. Into a 50 mL 3 necked round bottom flask equipped with an argon purge, reflux condenser, and stirring rod with a paddle, was added 2,2'6, 6'-tetramethyl-1-piperidinyloxy (TEMPO, 104 mg, 0.671 mmol), benzoyl peroxide (BPO 147 mg, 0.606 mmol, styrene (2.93 g, 19.2 mmol), and chloromethylstyrene (CMS, 18.0 g, 118 mmol). The solution was then immersed half way into a preheated oil bath (130° C.) and then stirred for 4 hrs. The reaction mixture was then cooled to approximately 80° C. and diluted with 10 mL of toluene and 40 mL of tetrahydrofuran. White polymer powder was recovered by precipitation of the diluted solution into 2 L of methanol and filtered. The polymer was redissolved in THF, and precipitated second time in methanol, filtered, and vacuum dried overnight at 60° C. Total recovered polymer of copoly (chloromethylstyrene-styrene) was 10.4 g. GPC Data: Mw=26,400, Mn=21,200, PD=1.24.

EXAMPLE V

Random Co-polymerization of Chloromethylstyrene and Styrene (1:1=PCMS/PS)

A random copolymer, copoly(chloromethylstyrene-styrene), of the formula PCMS/PS of Example IV, wherein n is approximately 45 and m is approximately 45 was prepared as follows. Into a 50 mL 3 necked round bottom flask equipped with an argon purge, reflux condenser, and stirring rod with a paddle, was added 2,2'6,6'-tetramethyl-1-piperidinyloxy (TEMPO, 52 mg, 0.333 mmol), benzoyl peroxide (BPO 73 mg, 0.303 mmol, styrene (5.0 g, 48 mmol) and chloromethylstyrene (CMS, 7.32 g, 48 mmol). The solution was then immersed half way into a preheated oil bath (130° C.) and then stirred for 4 hrs. The reaction mixture was then cooled to approximately 80° C. and diluted with 10 mL of toluene and 40 mL of tetrahydrofuran. White polymer powder was recovered by precipitation of the diluted solution into 2 L of methanol and filtered. The polymer was redissolved in THF, and precipitated second time in methanol, filtered, and vacuum dried overnight at 60° C. Total recovered polymer of copoly (chloromethylstyrene-styrene) was 6.0 g. GPC Data: Mw=13,900, Mn=11,400, PD=1.22.

EXAMPLE VI

Acrylation of Homopoly(chloromethylstyrene) of Example I

A general procedure follows for all subsequent acrylation/substitution reactions below.

To 10 grams of the PCMS polymer prepared in Example I dissolved in 50 mL of dimethylacetamide was added 3 grams of the sodium salt of acrylic acid. The mixture was stirred at room temperature for 3 days in the dark. The partially acrylated polymer was recovered by precipitation of the polymer solution into one liter of a water/methanol mixture (75/25) and the white polymer recovered by filtration, washed with excess methanol (2×150 mL) and allowed to air dry. The sample was further dried to remove residual solvent by vacuum drying for 16 hours. The polymer was characterized by $^1$H NMR, which showed by the ratio of the chloromethyl groups to acrylated methyl groups that approximately 25% of the chloromethyl groups had been substituted. The product is believed to be of the formula

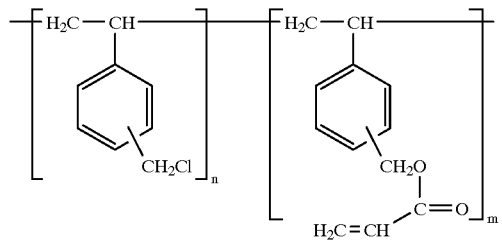

PCMS/PAMS

GPC revealed only the expected molecular weight increase due to acrylate substitution. Total recovered polymer of copoly(chloromethylstyrene-acrylated methyl styrene) (PCMS/PAMS), was 9.8 g (95% yield). GPC Data: Mw=24,700, Mn=18,200, PD=1.35.

EXAMPLE VII

Acrylation of Homopoly(chloromethylstyrene) of Example II

Example VI was repeated. The polymer product was characterized by $^1$H NMR, which showed 25% of the available chloromethyl groups had been substituted by acrylated methyl groups. GPC revealed only the expected molecular weight increase due to substitution. The total recovered polymer of copoly(chloromethylstyrene-acrylated methyl styrene) was 9.5 g (91% yield). GPC Data: Mw=41,800, Mn=27,800, PD=1.50.

EXAMPLE VIII

Acrylation of Homo Poly(chloromethylstyrene) from Example III

Example VI was repeated. The polymer was characterized by $^1$H NMR, which showed by the ratio of the chloromethyl groups to acrylated methyl groups that approximately 30% of the chloromethyl groups had been substituted. GPC revealed only the expected molecular weight increase due to substitution. The total recovered polymer of copoly (chloromethylstyrene-acrylated methyl styrene) was 9.0 g (89% yield). GPC Data: Mw=27,600, Mn=22,100, PD=1.25.

EXAMPLE IX

Acrylation of 9/1 Copoly(styrene-chloromethylstyrene) of Example IV

Example VI was repeated with the exception that 5 grams of the PS/PCMS copolymer was used. The polymer was characterized by $^1$H NMR, which showed 30% of the available chloromethyl groups had been substituted for acrylated methyl groups. GPC revealed only the expected molecular weight increase due to substitution. The total recovered polymer of copoly(chloromethylstyrene-acrylated methyl styrene- styrene) was 9.7 g (95% yield). GPC Data: Mw=28,700, Mn=21,200, PD=1.25.

EXAMPLE X

Acrylation of 1:1 Copoly(styrene-chloromethylstyrene) from Example V

Example VI was repeated with the exception that 5 grams of the PS/PCMS copolymer was used. The polymer product was characterized by $^1$H NMR, which showed 21% of the available chloromethyl groups had been substituted by acrylated methyl groups. GPC revealed only the expected molecular weight increase due to substitution. The total recovered polymer of copoly(chloromethylstyrene-acrylated methyl styrene- styrene) was 5.2 g (85% yield). GPC Data: Mw=14,400, Mn=11,600, PD=1.25.

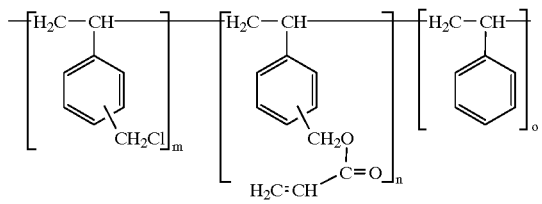

EXAMPLE XI

Acrylation of Homopoly(chloromethylstyrene)

To 8 grams of the previously prepared poly (chloromethylstyrene) polymer (Mw=26,300, Mn=21,200, PD=1.41) from Example III dissolved in 30 mL of dimethylacetamide was added 5.7 grams of the sodium salt of methacrylic acid. The mixture was stirred at 50° C. for 3 days in the dark. The partially methacrylated polymers were recovered by precipitation of the polymer solution into one liter of a water/methanol mixture (75/25) and the white polymer recovered by filtration, washed with excess methanol (2×150 mL) and allowed to air dry. The sample was further dried to remove residual solvent by vacuum for 16 hours. The polymer of copoly(chloromethylstyrene-acrylated methyl styrene) was characterized by $^1$H NMR which showed by the ratio of the chloromethyl groups to methacrylated methyl groups that approximately 37% of the chloromethyl groups had been substituted. Yield was 6.8 grams (90% ). GPC Data: Mw=33,500, Mn=23,000, PD=1.45.

EXAMPLE XII

Dimethylaminoethylacrylation of Homopoly (chloromethylstyrene)

To 10 grams of the previously prepared poly (chloromethylstyrene) polymer (Mw=26,300, Mn=21,200, PD=1.41) from Example III dissolved into a solution containing a 50 mL mixture of a 70/30 ratio of THF/MeOH and 20 mL of dimethylethylaminoacrylate (0.15 mol). The mixture was stirred at 70° C. for 3 days in the dark. The partially aminoacrylated polymers were recovered by precipitation of the polymer solution into one liter of an isopropanol and the white polymer recovered by filtration. The sample was further dried to remove residual solvent by vacuum drying overnight. The polymer of copoly (chloromethylstyrene-dimethylaminoethylacrylated methyl styrene) was characterized by $^1$H NMR. The degree of substitution of 43% was calculated from the ratio of chloromethyl to aminomethylated protons. Yield was 7.4 grams (70% ). GPC of this sample was not obtained since the product was THF insoluble.

EXAMPLE XIII

One Pot Scaleup of the Partially Acrylated Polychloromethylstyrene by Stable Free Radical Polymerization (SFRP) Polymerization In a Buchi Reactor.

In order to accommodate the larger bulk polymerization with effective heat transfer, a 2 L stainless steel Buchi reactor equipped with programmable oil heating unit was used. In this bulk polymerization, the reactor was charged with 859 g (5.24 mol, 800 mL) of chloromethylstyrene (Dow), 3.81 g of the benzoyl peroxide initiator (Aldrich), and 3.25 g of TEMPO (Nova Chemicals), purged with argon, and slowly heated to 135° C. Caution was taken to avoid exotherms during polymerization by closely monitoring the reaction temperature with an internal thermocouple. Reactions were periodically sampled and the degree of conversion measured by TGA and GPC. The reaction time for the homopolymerization of PCMS was similar to smaller scale polymerization done in glass, and the sample had effectively reached 90% conversion in less than about 4 hrs. Afterwards, the bulk polymerization was cooled to 50° C. to terminate the polymerization, and the solutions diluted with 1 L of dimethylacetamide. Once the reaction solutions had equilibrated to 50° C., dry sodium acrylate (129.6 g, Aldrich) was introduced into the reactor in a slight molar excess with respect to the chloromethyl groups. Stirring was continued for 3 days at this temperature until the desired degree of substitution had been achieved. The reactor was then discharged and the solution diluted a further 50% with dimethylacetamide, and precipitated into a large excess of methanol (16 L), isolated by filtration, and dried under vacuum. A yield in excess of about 85 percent of an off white polymer were obtained. The starting material and product polymers of partially acrylated polychloromethylstyrene were characterized by GPC and $^1$H NMR as follows: 100% PCMS Base Resin: Mw=35,480, Mn=23,770, Mp =38,530, PD=1.49; and 85/15% PCMS/PAMS polymer: Mw=37,990, Mn=25110, Mp=43130, PD=1.51. Care was exercised to avoid inadvertent cross-linking of the sample by protecting the sample from light.

EXAMPLE XIV

One Pot Scaleup of the Partially Acrylated Copoly (chloromethylstyrene-styrene) by SFRP Polymerization in a Buchi Reactor In order to accommodate the larger bulk polymerization with effective heat transfer, a 2 L stainless steel Buchi reactor equipped with a programmable oil heating unit was used. In these bulk polymerizations the reactor was charged with 279.2 g (1.7 m, 260 mL) of chloromethylstyrene (Dow), 444.6 g (4.7 m, 489 mL) of styrene (Fluka), 3.5 g of the benzoyl peroxide initiator (Aldrich), and 2.6 g of TEMPO (Nova Chemicals), purged with argon, and slowly heated to 135° C. Caution was taken to avoid exotherms during polymerization by closely monitoring the reaction temperature with an internal thermocouple. Reactions were periodically sampled and the degree of conversion measured by TGA. In the case of homopolymeric sample PCMS, the reaction time was similar to smaller scale polymerization done in glass, and the sample had effectively reached 90% conversion in less than 4 hrs. In the case of the 70/30 PS/PCMS copolymer, 75% conversion was achieved in 7 hrs. In both reactions, the bulk polymerizations were cooled to 50° C. to terminate the polymerizations, and the solutions diluted with 1.5 L of dimethylacetamide. Once the reaction solutions had equilibrated to 50° C., 200 g of dry sodium acrylate (Aldrich) was introduced into the reactor in a slight excess. Stirring was continued for four days until all of the chloromethyl sites had been substituted with acrylate. The reactor was then discharged and the solution diluted 50% further with dimethylacetamide, and precipitated into a large excess of methanol (16 L), isolated by filtration and dried under vacuum. A yield of about 75% of partially acrylated copoly(chloromethylstyrene-styrene) as an off white polymer was obtained. Materials were characterized by GPC and $^1$H NMR: 70/30% PS/PCMS Base Resin: Mw=36,900, Mn=25,910, Mp=40,940, PD=1.42; and 70/30% PS/PAMS polymer Mw=40,140, Mn=31,470, Mp=43,140, PD=1.28. Care was taken to avoid exposing the sample to light to avoid inadvertently crosslinking the material.

Other embodiments and modifications of the present invention may occur to one of ordinary skill in the art subsequent to a review of the information presented herein; these embodiments and modifications, as well as equivalents thereof, are also included within the scope of this invention.

What is claimed is:

1. A process comprising:
reacting a first polymer containing at least one haloalkyl substituted styrene, with a reactive acrylate compound wherein the haloalkyl substituent is converted to an alkylacrylate ester or an alkylacrylate ester ammonium salt to form an acrylated second polymer, and
irradiating said acrylated second polymer, wherein the halogen of said at least one haloalkyl substituted styrene is chloride, bromide, iodide, or fluoride, wherein the reactive acrylate compound is selected from the group consisting of an acrylic acid, an acrylic acid salt, an acrylate ester with from about 4 to about 25 carbon atoms, an alkyl substituted acrylate ester having from about 5 to about 25 carbon atoms, an alkyl substituted acrylic acid having from 5 to about 25 carbon atoms, an alkyl substituted acrylic acid salt having from 5 to about 25 carbon atoms, a dialkylaminoalkylacrylate having from 5 to about 25 carbon atoms, and mixtures thereof, wherein the alkyl of said at least one haloalkyl substituted styrene contains from 1 to about 20 carbon atoms, and wherein the polydispersity of said first polymer is from about 1.1 to about 2.0 and wherein said irradiating is for a sufficient time to enable the formation of a crosslinked third polymer.

2. A process in accordance with claim 1 wherein the first polymer is selected from homopolymers comprised of haloalkylstyrene monomers.

3. A process in accordance with claim 1 wherein the first polymer is selected from copolymers comprised of haloalkylstyrene monomers and monomers selected from styrene, alkylstyrenes, alkoxystyrenes, halostyrenes, dienes, alkyl acrylates, and alkacrylates, and mixtures thereof.

4. A process in accordance with claim 1 wherein said first polymer contains from about 0.1 percent to about 100 percent by weight of haloalkyl styrene mers.

5. A process in accordance with claim 1 wherein said first polymer contains from 1 to about 100,000 haloalkyl styrene mers.

6. A process in accordance with claim 1 wherein the acrylated polymer is selected from the group consisting of homopolymers of acrylated alkylstyrenes, random, block, multiblock, and tapered copolymers comprised of acrylated alkylstyrenes and at least one monomer selected from the group consisting of styrene, alkylstyrenes, alkoxystyrenes, halostyrenes, dienes, alkyl acrylates, and alkacrylates, and mixtures thereof.

7. A process in accordance with claim 1 wherein said reacting is accomplished thermally, electrochemically, photochemically, or combinations thereof.

8. A process in accordance with claim 1 wherein said irradiating is accomplished with a light source at from about 190 nanometers to about 400 nanometers.

9. A process comprising:
reacting a first polymer of the formula

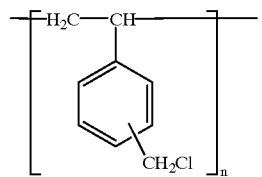

where n is an integer of from about 10 to about 100,000 and represents the number of chloromethylstyrene mers, with a reactive acrylate compound of the formula

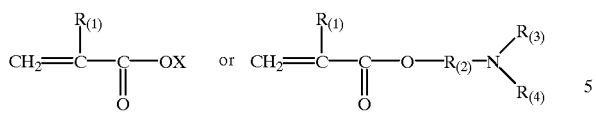

wherein X is hydrogen, an alkali metal, an alkaline earth, a linear or branched alkyl substituent with from 1 to about 25 carbon atoms, $R_{(1)}$ is selected from the group consisting of hydrogen, or linear and branched alkyl substituents with from 1 to about 25 carbon atoms, $R_{(2)}$ of the dialkylamino acrylate moiety is a linear or branched alkyl chain with from about 1 to about 25 carbon atoms, and $R_{(3)}$ and $R_{(4)}$ are linear or branched alkyl substituents with from about 1 to about 25 carbon atoms, to form a second acrylated polymer of the formula

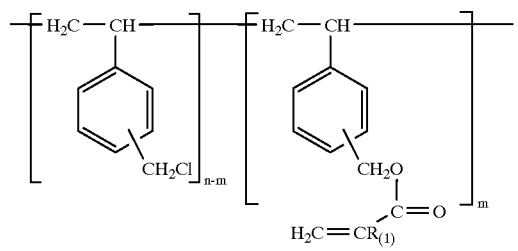

or

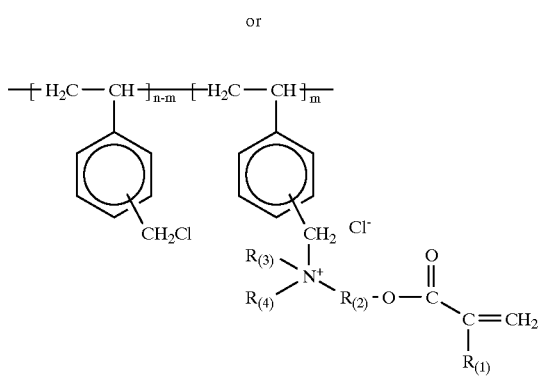

wherein m is an integer of from about 10 to about 100,000 and represents the number of acrylated monomer units, and n-m is an integer of from about 100,000 to about 10 and represents the number of unreacted chloromethylstyrene monomer units; and irradiating said second acrylated polymer to form a crosslinked third polymer or copolymer of the formula

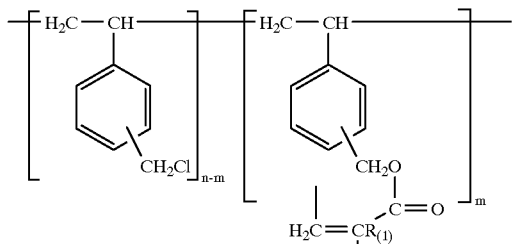

or

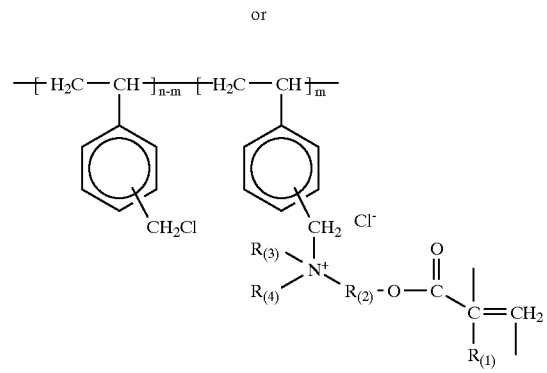

wherein from about 0.1 to about 100 percent of the acrylate double bonds contained in said second acrylated polymer are crosslinked in said third polymer or copolymer, and optionally heat curing at temperatures greater than 250° C. wherein said third polymer forms inter- or intramolecular methylene bridges between aryl substituents of the formula

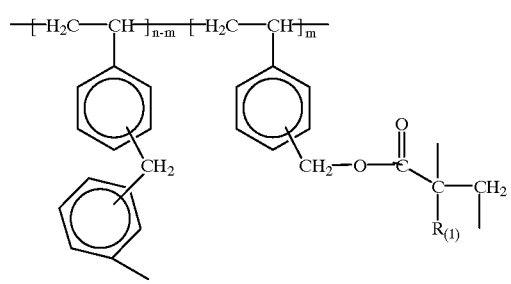

or

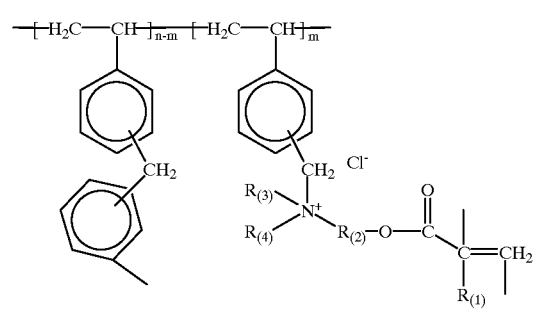

10. A process in accordance with claim 9, wherein said first polymer further comprises mers selected from the group consisting of styrene, alkylstyrenes, alkoxystyrenes, halostyrenes, dienes, alkyl acrylates, alkacrylates, and mixtures thereof.

11. A process in accordance with claim 9, wherein the reacting is accomplished by heating at a temperature of from about 30 to about 100° C.

12. A process in accordance with claim 9, wherein the reacting is accomplished by heating in the presence of polar aprotic solvent.

13. A process in accordance with claim 9, wherein the irradiating is accomplished in the presence of a sensitizer compound.

\* \* \* \* \*